(12) United States Patent
Moran et al.

(10) Patent No.: US 12,742,577 B2
(45) Date of Patent: Sep. 22, 2026

(54) DETECTING CONTAMINATION OF A CRYOGENIC REFRIGERANT IN A CRYOGENIC REFRIGERATION SYSTEM

(71) Applicant: Edwards Vacuum LLC, Sanborn, NY (US)

(72) Inventors: Peter F. Moran, Chelmsford, MA (US); Steven Edward Zacharski, Chelmsford, MA (US)

(73) Assignee: Edwards Vacuum LLC, Sanborn, NY (US)

( * ) Notice: Subject to any disclaimer, the term of this patent is extended or adjusted under 35 U.S.C. 154(b) by 182 days.

(21) Appl. No.: 18/696,108

(22) PCT Filed: Oct. 28, 2022

(86) PCT No.: PCT/IB2022/060369
§ 371 (c)(1),
(2) Date: Mar. 27, 2024

(87) PCT Pub. No.: WO2023/073624
PCT Pub. Date: May 4, 2023

(65) Prior Publication Data

US 2024/0401858 A1 Dec. 5, 2024

(30) Foreign Application Priority Data

Nov. 1, 2021 (GB) ..................................... 2115660

(51) Int. Cl.
*F25B 49/00* (2006.01)
*F25B 9/00* (2006.01)
(Continued)

(52) U.S. Cl.
CPC ............ *F25B 49/005* (2013.01); *F25B 9/002* (2013.01); *F25B 41/20* (2021.01); *G01N 27/18* (2013.01); *F25B 2600/2515* (2013.01)

(58) Field of Classification Search
CPC ........ F25B 2700/00; F25B 9/00; F25B 49/02; F25B 2600/2519; F25B 2600/0251;
(Continued)

(56) References Cited

U.S. PATENT DOCUMENTS 3,020,746 A * 2/1962 Minter ................ G01N 27/185 73/40.7
3,560,362 A * 2/1971 Kasamatsu et al. ... B01J 19/081 522/182
(Continued)

FOREIGN PATENT DOCUMENTS

CN 101377469 A 3/2009
CN 112557158 A * 3/2021 ......... G01N 33/0004
(Continued)

OTHER PUBLICATIONS

Japanese Notification of Reason for Rejected dated Mar. 31, 2025 for corresponding Japanese application Serial No. 2024-524654, 10 pages.

(Continued)

*Primary Examiner* — Kun Kai Ma
(74) *Attorney, Agent, or Firm* — Theodore M. Magee; Westman, Champlin & Koehler, P.A.

(57) ABSTRACT

A sensor for detecting contamination of a cryogenic refrigerant in a cryogenic refrigeration system, a method and a refrigeration system are disclosed. The sensor comprises: an inlet for coupling to a cryogenic refrigerant flow path in the cryogenic refrigeration system and a thermal conductivity detector in fluid communication with the inlet. The thermal conductivity detector is configured to generate a signal indicative of a detected thermal conductivity of the cryogenic refrigerant received from the cryogenic refrigeration system when the sensor is coupled thereto. The sensor also comprises circuitry configured to convert the thermal conductivity signal to an indication of contamination of the
(Continued)

cryogenic refrigerant; and an output configured to output the indication of contamination of the cryogenic refrigerant.

15 Claims, 6 Drawing Sheets

(51) Int. Cl.
*F25B 41/20* (2021.01)
*G01N 27/18* (2006.01)

(58) Field of Classification Search
CPC ........ F25B 49/005; F25B 41/20; F25B 9/002; F25B 2600/2515; F25B 2600/021; F25B 2700/151; G01N 27/18
See application file for complete search history.

(56) References Cited

U.S. PATENT DOCUMENTS

| | | | | |
|---|---|---|---|---|
| 2005/0126264 | A1 * | 6/2005 | Komninos .............. | G01M 3/24<br>73/40.5 A |
| 2012/0024043 | A1 * | 2/2012 | McBrady ............... | G01N 30/66<br>73/25.03 |
| 2018/0087815 | A1 | 3/2018 | Kujak et al. | |

FOREIGN PATENT DOCUMENTS

| | | | | | |
|---|---|---|---|---|---|
| DE | 102014106729 | A1 | | 11/2015 | |
| DE | 202017105769 | U1 | * | 12/2017 | ......... G01N 33/0032 |
| JP | S59100366 | A | | 6/1984 | |
| JP | S63193056 | A | | 8/1988 | |
| JP | H02306152 | A | | 12/1990 | |
| JP | H03241268 | A | | 10/1991 | |
| JP | H07146042 | A | | 6/1995 | |
| JP | H0833365 | B2 | * | 3/1996 | |
| JP | 2741778 | B2 | * | 4/1998 | |
| JP | 2009192181 | A | | 8/2009 | |
| JP | 2011169778 | A | | 9/2011 | |
| JP | 2019528463 | A | | 10/2019 | |
| WO | 2011143398 | A1 | | 11/2011 | |
| WO | WO-2012028685 | A1 | * | 3/2012 | ............. G01N 25/20 |

OTHER PUBLICATIONS

PCT Notification of Transmittal of the International Search Report and the Written Opinion of the International Searching Authority, or the Declaration, PCT International Search Report and PCT Written Opinion dated Jan. 26, 2023 for corresponding PCT application Serial No. PCT/IB2022/060369, 13 pages.

British Search Report dated Mar. 15, 2022 for corresponding British application Serial No. GB2115660.9, 1 page.

Taiwanese Search Report dated Jan. 22, 2026 for corresponding Taiwanese application Serial No. 111141540, 1 page.

* cited by examiner

DETECTING CONTAMINATION OF A CRYOGENIC REFRIGERANT IN A CRYOGENIC REFRIGERATION SYSTEM

CROSS-REFERENCE TO RELATED APPLICATION

This application is a Section 371 National Stage Application of International Application No. PCT/IB2022/060369 filed Oct. 28, 2022, and published as WO 2023/073624 A1 on May 4, 2023, the content of which is hereby incorporated by reference in its entirety and which claims priority of British Application No. 2115660.9, filed Nov. 1, 2021.

FIELD

The field of the invention relates to detecting contamination of a cryogenic refrigerant within a cryogenic refrigeration system.

BACKGROUND

Cryogenic cooling systems use refrigerants such as helium. The purity of the refrigerant is important as impurities freeze out at the lower temperatures of the system and may cause damage or reduced performance. Conventional systems monitor the refrigerants periodically to ensure that contamination levels remain below acceptable levels. This may be done by taking a sample and using a RGA (residual gas analyzer) to determine the contaminants within the sample. The RGA is a complex instrument and is generally located at a remote site and requires significant expertise to operate it.

It would be desirable to have an analysis technique that allowed regular and inexpensive analysis to be performed in a manner that did not unduly disturb the normal operation of the system.

The discussion above is merely provided for general background information and is not intended to be used as an aid in determining the scope of the claimed subject matter. The claimed subject matter is not limited to implementations that solve any or all disadvantages noted in the background.

SUMMARY

One aspect provides a sensor for detecting contamination of a cryogenic refrigerant in a cryogenic refrigeration system, said sensor comprising: an inlet for coupling to a cryogenic refrigerant flow path in said cryogenic refrigeration system; a thermal conductivity detector in fluid communication with said inlet, said thermal conductivity detector being configured to generate a signal indicative of a detected thermal conductivity of said cryogenic refrigerant received from said cryogenic refrigeration system when said sensor is coupled thereto; circuitry configured to convert said thermal conductivity signal to an indication of contamination of said cryogenic refrigerant; and an output configured to output said indication of contamination of said cryogenic refrigerant.

The inventors of the present invention recognised that refrigerants such as helium that are used in cryogenic systems have a high conductivity that is in many cases quite different to the conductivity of other impurities that might leak into the refrigerant within the system. They also recognised that being able to identify the presence of impurities or contamination within the cryogenic refrigerant in-situ would enable the refrigerant to be tested more regularly and for any contamination to be detected earlier. Thus, embodiments provide a sensor that has a thermal conductivity detector for detecting the conductivity of the refrigerant within the cryogenic refrigeration system itself. This allows the testing to be performed regularly and the results to be available at once. In this way early detection of contamination using a relatively low cost, easy to use sensor is provided. Such a sensor may not be able to identity the nature of the contamination as accurately as a conventional RGA analyser, however, being able to detect whether or not refrigerant contamination is present allows the cryogenic system to be protected and where it is determined that a more accurate analysis might be helpful then this can be performed. In this way the more onerous remote sensing of the refrigerant if used, can be accurately targeted to situations where the results are required and far less often than is conventionally the case.

In some embodiments, the sensor has only one port for coupling to the cryogenic refrigerant flow path, this single port acting as an inlet for allowing the flow to enter the sensor and also as an outlet when the detection has been performed, at which point the refrigerant may be voided from the sensor. However, in other embodiments there is both an inlet and an outlet with the thermal conductivity detector arranged between the two allowing the flow to pass through the sensor such that the refrigerant within the sensor is continually being replenished and is representative of the refrigerant in the refrigeration system.

Although the refrigerant may have different forms provided that it is configured to operate at cryogenic temperatures, generally temperatures below 100 k, in some embodiments the refrigerant is helium. Helium is often used as a refrigerant in cryogenic systems and embodiments are particularly effective at detecting contaminants in helium as it has a conductivity in the gaseous state that is very high compared to other gasses and in particular compared to the gaseous impurities that are likely to be found in a contaminated refrigerant. Thus, any contamination within a helium flow causes a significant change in thermal conductivity and is therefore able to be detected to a significant degree of accuracy.

In some embodiments, said sensor further comprises control circuitry, said control circuitry comprising an input for receiving at least one signal indicative of a current state of said refrigeration system, said control circuitry being configured to control operation of said thermal conductivity detector in dependence upon said at least one received signal.

The sensor is configured to be mounted on the refrigeration system such that it can measure the conductivity and thereby the contamination of the cryogenic refrigerant in-situ. It may be controlled by control circuitry that receives signals indicative of the current operational state or condition of the refrigeration system, these signals being used to control the sensor to perform the thermal conductivity detections. In this regard, the signals may be indicative of the current operational state such as whether it is entering a regeneration state, and/or they may be indicative of a property of the cryogenic refrigerant within the refrigeration system such as the temperature, pressure or flow rate, these also being indirect indicators of the current operational state of the refrigeration system and having an effect on the thermal conductivity measurement.

In some embodiments, said sensor further comprises at least one valve arranged to control flow of said cryogenic refrigerant to and from said sensor.

In some embodiments, the sensor may be mounted within the refrigeration system within the cryogenic refrigerant flow and there may be no valves associated with the sensor. However, in other embodiments there may be one or more valves associated with the inlet and/or the outlet of the sensor, the valves being configured to control the flow to and from the sensor. Valves may be used where for example, the sensor is in a bypass line such that cryogenic refrigerant is diverted from its usual flow path to flow through the bypass line and therefore the sensor when a measurement is to be performed. When no measurement is to be performed the valves may be closed and the refrigerant may flow through the bypass line. In this regard, it may be preferred to perform the thermal detection measurements in stagnant flow and thus, it may be advantageous to be able to control the flow with valves, such that refrigerant indicative of the system is captured but is stagnant when a measurement is performed.

Additionally and/or alternatively, the control circuitry may control the measurements in response to the refrigeration system operation and in particular when the cryogenic refrigerant flow has been halted.

In other embodiments, the sensors may be within the flowing refrigerant and the circuitry configured to convert the thermal conductivity measurement to a contamination indication may receive a signal indicative of the flow rate such that the conversion can take account of flow effects such as turbulence on the thermal conductivity measurements.

In some embodiments, said control circuitry is configured to control operation of said at least one valve.

Where there are valves associated with a sensor then the control circuitry operation of the thermal conductivity detector may also control operation of the one or more valves.

In some embodiments, said control circuitry is configured to initiate said thermal conductivity detector to perform a thermal conductivity detection in response to determining said received signal indicating that said cryogenic refrigeration system is in a regeneration phase.

As noted previously a problem with contamination in a cryogenic refrigeration system is that the contaminants freeze out at cryogenic temperatures and this may cause damage and/or restrict flow. When testing for contamination it may therefore be more accurate and effective to do so at temperatures that are above cryogenic temperatures where the contaminants will not be frozen and will be present within the refrigerant within the sensor. Where the cryogenic refrigeration system is used for example as a cryogenic vacuum pump then it will periodically have a regeneration phase where the cryocoolers of the cryopump are brought up above cryogenic temperatures to release captured molecules. In such a system it may be an advantageous time to perform the contamination detection measurements during such a period. Thus, in some embodiments the control circuitry is configured to initiate the sensor to perform the thermal conductivity measurements upon determining that the system is in a regeneration phase and perhaps has reached a certain temperature.

A further advantage of performing the thermal conductivity measurements during the regeneration phase is that a compressor and the cryopumps are not operational during much of the regeneration phase and the flow is stagnant. This means that measurements do not need to correct for flow effects such as turbulence and a more accurate or at least a simpler measurement may be performed.

In some embodiments, said control circuitry is configured in response to determining that said cryogenic refrigeration system is below 200K preferably below 100K and said contaminants are frozen within said cryogenic refrigeration system to initiate said thermal conductivity detector to perform said thermal conductivity detection as a baseline thermal conductivity detection.

As discussed above where the refrigeration system is at cryogenic temperatures then the contaminants may be captured. In particular, where the cryogenic refrigeration system is below 200K preferably below 100K many contaminants will be frozen within the coldest part of the system and detecting the thermal conductivity of the cryogenic refrigerant away from the coldest part will provide a baseline indication of a substantially pure refrigerant. Thus, it may be advantageous to periodically perform such thermal conductivity detections. These are useful in order to be able to accurately compare the difference in thermal conductivity of the cryogenic refrigerant with and without contaminants measured by the same sensors in the same positions and to convert these readings to an amount of contamination. Where the refrigeration system periodically performs a regeneration phase then this baseline detection may be performed at or near the start of the regeneration phase where the cryogenic refrigerant is stagnant and there is no flow and the coldest part of the refrigeration system is still at cryogenic temperatures. This baseline measurement may be performed for each regeneration cycle, or it may be performed for a subset, such that after a certain time or number of regeneration cycles the baseline measurement is repeated and the thermal conductivity measurements that are used as comparisons are updated.

In some embodiments, said control circuitry is configured in response to determining that said refrigeration system is above 220K preferably above 270K to control said thermal conductivity detector to initiate said thermal conductivity detector to perform said thermal conductivity detection as a contamination thermal conductivity detection.

In order to perform an accurate measurement of contaminants where they are present within the cryogenic refrigerant, it may be advantageous to perform them when the refrigeration system is determined to be above cryogenic temperatures, for example above 220K, preferably above 270K. Where the refrigeration system comprises a regeneration phase then this higher temperature may occur some way into the regeneration phase and the system may perform a mixing cycle prior to performing the thermal conductivity detection. The mixing cycle may comprise the compressor and pumps of the refrigeration system operating for a very short period of time to mix the refrigerant around the system such that the contaminants that were held within the cooler part of the system are distributed within the refrigerant. The mixing cycle does not occur for a long length of time as cooling is not desired during this cycle. It may last for more than 30 seconds and generally for less than 5 minutes.

In some embodiments, said circuitry is configured to convert said thermal conductivity signal to an indication of contamination of said cryogenic refrigerant in dependence upon both said baseline thermal conductivity detection and said contamination thermal conductivity detection.

The circuitry that converts the determined thermal conductivity to an indication of a contamination may take account of the baseline thermal conductivity detection where there is one, such that the difference between the two signals may give an accurate indication of contamination.

The thermal conductivity detector may take a number of forms, in some embodiments the thermal conductivity detector comprises a filament thermal conductivity detector.

Filament thermal conductivity detectors are relatively inexpensive and easy to operate. In some embodiments, there may be two filament thermal conductivity detectors, a filament thermal conductivity detector and a further reference filament thermal conductivity detector, said further reference filament thermal conductivity detector being isolated from said refrigeration system and comprising refrigerant of a predetermined purity, said circuitry being configured to convert said thermal conductivity signal to an indication of contamination of said cryogenic refrigerant in dependence upon a comparison of said thermal conductivity detection of said further reference filament thermal conductivity detector and said filament thermal conductivity detector.

In order to provide an accurate detection of contamination a filament thermal conductivity detector may require a reference thermal conductivity detector which detects the conductivity of the pure or substantially pure refrigerant and the difference in thermal conductivity between that and the thermal conductivity of the actual refrigerant is used as an indication of contamination.

In other embodiments, said thermal conductivity detector comprises a microelectromechanical system (MEMS) device.

A MEMS device may be preferable to a filament detector as it is more accurate and more independent of turbulence and sensor orientation. It also does not require a second device to act as a reference device but can itself perform a baseline measurement at a different time and use the comparison to improve accuracy.

In some embodiments, said circuitry is configured to receive signals indicative of at least one of temperature and pressure of said refrigerant and to convert said thermal conductivity signal to said indication of contamination in dependence upon said at least one temperature and pressure.

The thermal conductivity that is measured by the thermal conductivity detector is dependent on temperature and pressure of the refrigerant and thus, in some embodiments the circuitry may receive signals indicative of these values and may use them in its determination of contamination. In some embodiments, the sensor itself may comprise at least one of the temperature and/or pressure sensor or it may have an input for receiving signals from the refrigeration system that are indicative of the temperature and pressure of the refrigerant. In this regard, it may be advantageous if the sensor itself comprises a temperature sensor as this has a significant effect on thermal conductivity and it may be desirable to measure the temperature as close as possible to the place where thermal conductivity is measured.

Further aspects provide a cryogenic refrigeration system comprising a cryogenic refrigerant and a sensor for determining contamination of said cryogenic refrigerant according to one aspect.

In some embodiments the cryogenic refrigeration system further comprises at least one compressor for compressing said cryogenic refrigerant, at least one pump, and a controller for controlling operation of said cryogenic refrigeration system, said controller being configured to control a mixing cycle by triggering operation of said compressor and said at least one pump for a predetermined time prior to transmitting a signal to said sensor for initiating detection of said contamination of said cryogenic refrigerant.

In some embodiments said at least one pump comprises a cryogenic pump.

As noted previously, when determining the contamination of the cryogenic refrigerant by detecting thermal conductivity it may be desirable to perform a mixing cycle to distribute the contaminant within the refrigerant. This may be particularly advantageous where the system is in the process of warming up and is stagnant, perhaps during a regeneration phase. Thus, in some embodiments there may be a control circuitry associated with the refrigeration system that is configured to control a mixing cycle prior to transmitting a signal to the sensor initiating a thermal conductivity measurement.

A yet further aspect provides a method of detecting contamination of a cryogenic refrigerant in a cryogenic refrigeration system, said method comprising:

- coupling a sensor comprising a thermal conductivity detector to a cryogenic refrigerant flow path in said cryogenic refrigeration system such that cryogenic refrigerant flows into said thermal conductivity detector;
- measuring the thermal conductivity of said cryogenic refrigerant with said thermal conductivity detector;
- converting said measured thermal conductivity to an indication of an amount of contamination of said cryogenic refrigerant; and
- outputting said indication of contamination of said cryogenic refrigerant.

In some embodiments said refrigeration system comprises a cryogenic pump system.

In some embodiments, said method comprises an initial step of determining that said refrigeration system is entering a regeneration phase, said step of measuring said thermal conductivity being performed during said regeneration phase.

In some embodiments, said method comprises determining that said cryogenic refrigeration system is at cryogenic temperatures, preferably below 100K and performing a baseline thermal conductivity measuring step.

In some embodiments, said method comprises determining that said refrigeration system is above cryogenic temperatures, preferably above 200K prior to performing said step of measuring said thermal conductivity.

In some embodiments, said step of converting said measured thermal conductivity to an indication of an amount of contamination of said cryogenic refrigerant comprises comparing said measured thermal conductivity with said measured baseline thermal conductivity.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

The summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present invention will now be described further, with reference to the accompanying drawings, in which.

DETAILED DESCRIPTION

Figure 1:
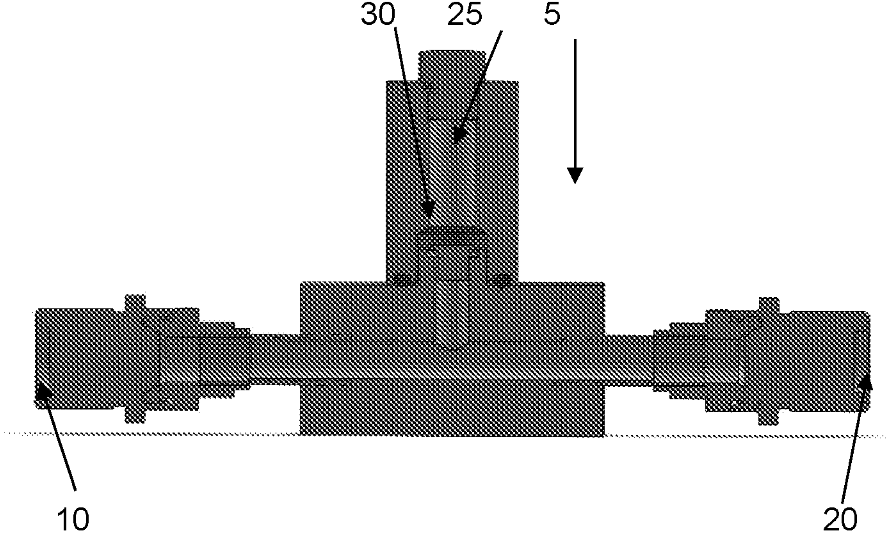
FIG. 1 shows a section through a sensor according to an embodiment.

Before discussing the embodiments in any more detail, first an overview will be provided.

Embodiments provide a method and means for the monitoring of refrigerant, in particular helium stream purity using thermal conductivity measurements in order to determine the presence of gas contamination in a cryogenic refrigeration system such as a cryo pump system. The development uses an in situ method to monitor refrigerant in some cases helium stream purity to determine the presence of contaminants prior to adverse impact on the system using gas thermal conductivity measurements, thereby mitigating the need for off site RGA analysis.

Various thermodynamic cycles such as the GM (Gifford McMahon) or Stirling cycle are used to generate very low temperatures and use Helium as the working fluid or refrigerant. One application of this technology is in cryo-pumps used to generate high vacuums, other applications include MRI scanners or high temperature superconductor cooling. In order for the proper operation of these systems, it is important to maintain the Helium inside the system to a well-defined level of purity. As the Helium purity decreases, the performance of the system degrades, ultimately leading to failure and the need for service and maintenance. Embodiments provide a method to measure the purity of a refrigerant for example, helium inside a refrigeration system of a cryogenic refrigeration system (while it is running) so that impurities can be detected before they reach levels that would cause pump failure.

The detection system uses Thermal Conductivity Detectors (TCD) which are used in gas chromatography. A TCD contains an electrical resistor that is placed in a gas flow path/volume. The temperature of the resistor changes (changing its resistivity) as heat is carried away from the resistor because of a gas flowing across it. Since different gasses have different thermal conductivities, gasses can be detected based on the rate of heat loss (change in resistivity) of the resistor.

Embodiments broadly describe two ways of using TCDs to determine refrigerant purity. Applicability of one method over the other is based on a number of factors including but not limited to system type, layout, sensitivity of detection required etc. The term helium or refrigerant environment can mean a stagnant volume or a stream of helium or refrigerant gas at any pressure and flow rate.

Use of a Two Sensor System—Filament TCD

This method used two separate TCD sensors where one sensor is placed in a high purity refrigerant environment and the other is placed in a potentially contaminated refrigerant environment. In this example the refrigerant is helium and because of the difference in conductivities of the pure and impure Helium environments, the resistivity of the TCD sensors is significantly different. A Wheatstone Bridge electrical circuit is used to convert the two sensor resistances to an output voltage that can be read by the system indicating how different the two streams are from one another. An increased difference between the voltage of the pure helium system and the system being tested indicates an increased contamination of the system.

Figure 6:
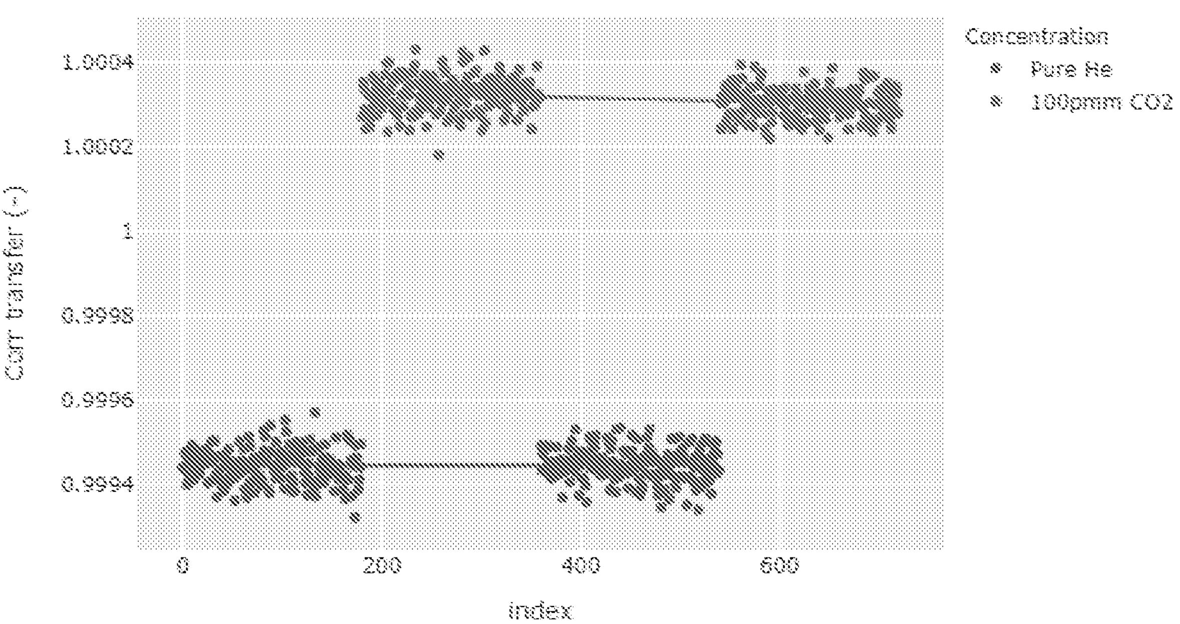
FIG. 6 shows the difference in thermal conductivity measurements for pure helium as opposed to helium contaminated with 100 pmm $CO_2$.

All gasses, excluding hydrogen, have a degree of thermal conductivity lower than that of helium. For this reason, helium is often used as a reference gas to compare thermal conductivities of gasses to, it is also a common refrigerant used in cryogenic systems. The standard or reference environment for Pure Helium is at 200 PSIG and the reference voltage observed at this environment is 5.2 mV. This voltage is collected over a set time and used in a zero-point calibration. The reference voltage is then subtracted from the obtained voltage when the impure gas in question is passed though the sensing TCD. This allows the user to calculate the change in voltage due to contamination of the helium stream as compared to pure helium. An example showing the difference in these voltages is shown in FIG. 6.

Use of One Sensor System—Mems Style TCD

The use of a MEMS (micro-electromechanical system) TCD can allow for the accurate contamination concentration prediction with the use of a single sensor. MEMS have a much higher signal to noise ratio than their filament counterparts. This in turn allows a single MEMS sensor assembly to sense changes in gas purity at sub 100 ppm quantities.

A MEMS solution is more elegant than a filament-based design as a single sensor can be zeroed in the pure gas refrigerant. Any change from the zero point at a fixed pressure and temperature can be attributed to a change in purity of the gas. Use of a TCD to monitor the purity of a cryogenic helium loop will allow for detection of contamination prior to adverse impact to the system. This monitoring can occur in-situ on a warm system. The TCD can be integrated directly into the refrigerant loop.

FIG. 1 shows a section through a filament type thermal conductivity detector TCD 5 according to an embodiment. The TCD 5 comprises an inlet coupling 10 and outlet coupling 20 for coupling to the refrigeration system of for example a cryo pump. When coupled to the system refrigerant flows through the TCD 5 from inlet 10 to outlet 20. The TCD comprises filament 30 which is heated and whose resistance depends on its temperature, which in turn depends on the thermal conductivity of the refrigerant. There is a passage 25 for receiving the wires for sending current to the filament 30 and allowing changes in the resistance to be detected. Circuitry not shown determines the resistance of the filament and in some embodiments compares this with the resistance of a corresponding filament in pure refrigerant and from the difference in the values a measure of contamination of the refrigerant is devised and output.

Figure 2:
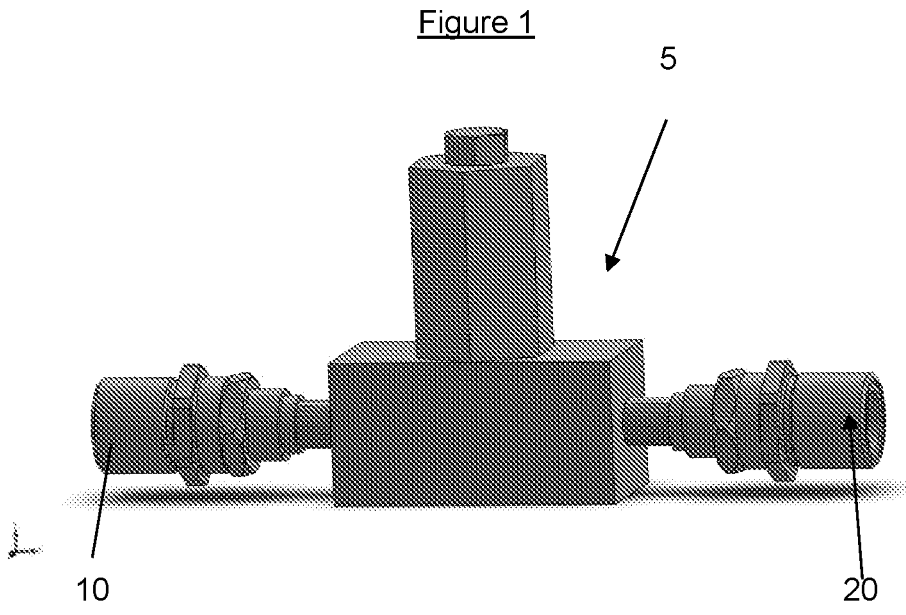
FIG. 2 shows a sensor according to an embodiment.

FIG. 2 shows the TCD 5 of FIG. 1 not in section, with inlet coupling 10 and outlet coupling 20.

Figure 3:
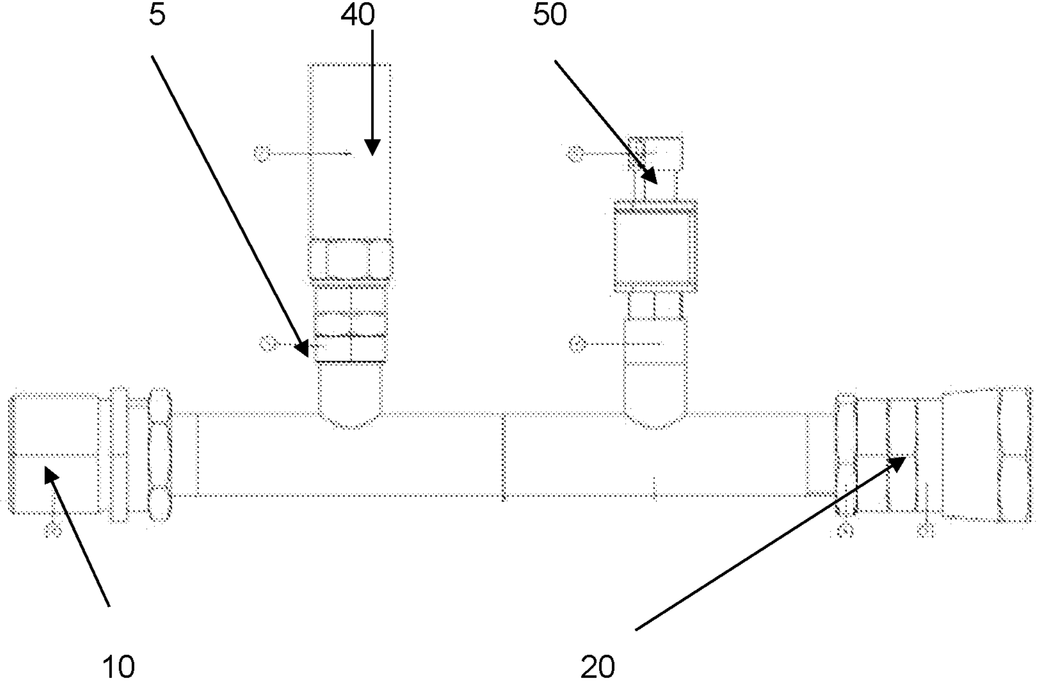
FIG. 3 shows a MEMS style TCD according to an embodiment.

FIG. 3 schematically shows a MEMS style TCD 5, with inlet and outlet couplings 10 and 20 and with an integrated temperature sensor 40 and pressure transducer 50. The thermal conductivity of the refrigerant gas will vary with the temperature and pressure and thus, some TCDs will have these sensors integrated into them, values from these sensors being used in the conversion of the detected thermal conductivity measurement to amount of contamination.

Figure 4:
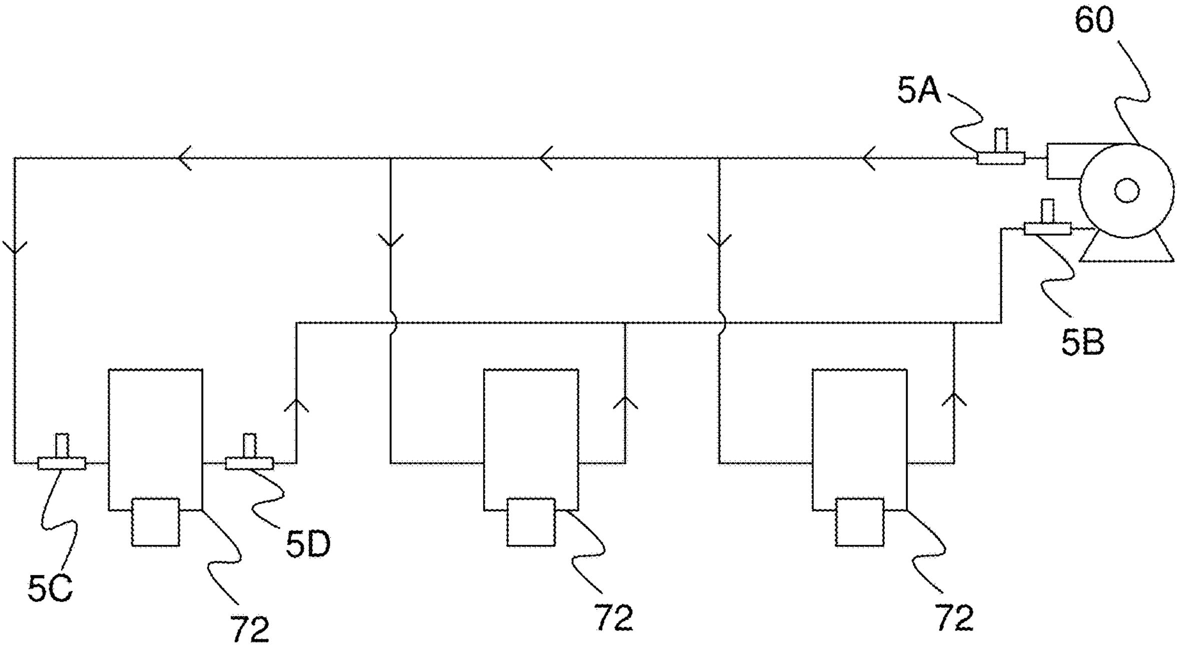
FIG. 4 shows a refrigeration system showing possible positions of sensors according to embodiments.

FIG. 4 schematically shows a refrigeration system and potential sites for TCDs 5 according to embodiments. The refrigeration system comprises a compressor 60 and a plurality of refrigeration units 72. Sensors according to embodiments may be used in this system for the monitoring of impurities. These TCD sensors 5 may be placed within the refrigerant lines themselves and four example locations for TCDs are shown. That is 5A in the compressor refrigerant supply line, 5B in the compressor refrigerant return line, 5C in the refrigerator unit supply or 5D in the refrigerator unit return line 5D.

Operation of the TCDs may be triggered by control circuitry (not shown) to take measurements at appropriate times. The thermal conductivity measurements may be converted to an indication of contamination of the refrigerant and this can be used in servicing decisions to avoid contaminants rising above critical levels. In some embodiments the TCDs may be filament style TCDs and may operate in conjunction with a reference filament TCD that contains pure refrigerant, differences in the thermal resistance of the reference and other TCD being used to determine the level of contaminants.

In other embodiments the TCD may be a MEMS style TCD and reference baseline measurements may be made, by taking measurements at cryogenic temperatures when contaminants are captured in the coldest part of the system and the refrigerant is therefore pure and comparing these with measurements taken at warmer temperatures, in some cases following a mixing cycle, where the contaminants are present in the refrigerant. The differences in the thermal conductivity of the baseline and warmer measurements are used to determine the level of contamination. These two measurements may be taken during a period where the refrigerant is not flowing, the baseline measurement being taken at the start of such a period where the temperatures are low and the other measurement being taken when the system has warmed.

In some embodiments measurements from pressure, temperature and in some cases flow sensors, either associated with the TCD itself or as separate components in the refrigeration system, may be used in the conversion of the thermal conductivity measurement to contamination indications.

Figure 5:
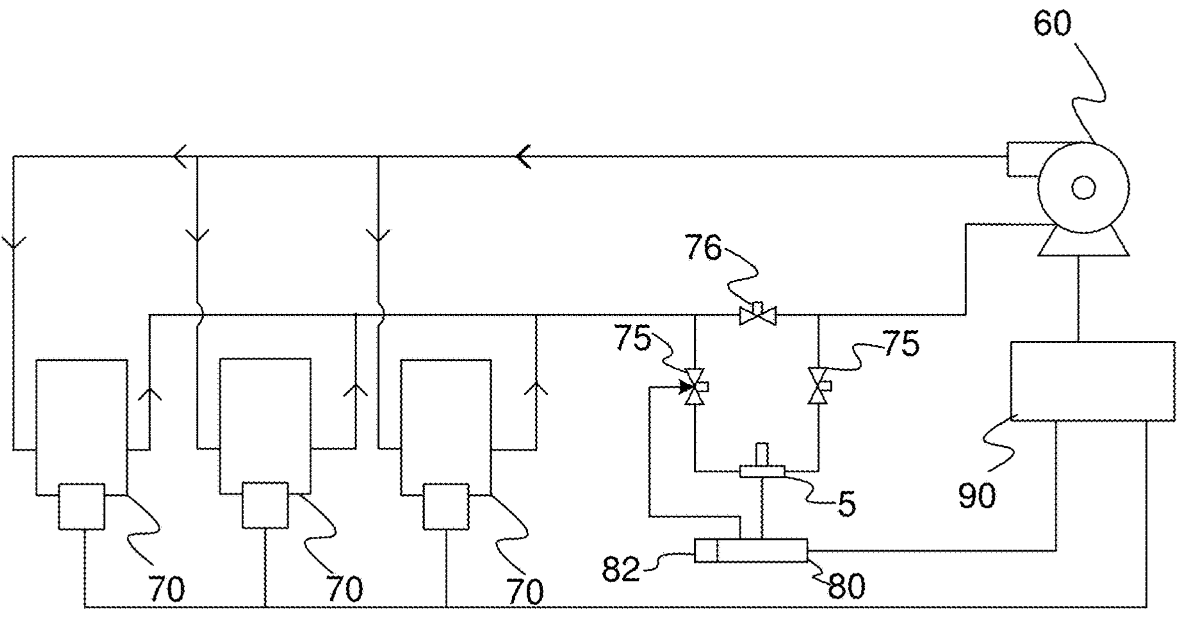
FIG. 5 shows a refrigeration system showing a sensor according to an embodiment in a bypass line.

FIG. 5 shows an alternative system where the refrigeration units of FIG. 4 are replaced by cryopumps 70. In this embodiment the TCD 5 is within a bypass line. Flow within the bypass line is controlled by valves 75 and 76 which in turn are controlled by control circuitry 80. Control circuitry 80 also controls operation of the TCD 5 and receives signals indicative of conductivity from the TCD 5 along with pressure and temperature measurements from other sensors not shown. The control circuitry 80 also receives signals from and sends signals to the refrigeration system controller 90, that controls the operation of the refrigeration system. Thus, in some embodiments control circuitry 80 may receive a signal indicating a regeneration cycle is about to start from the refrigeration system controller 90 and in response it may control valves 75 in the bypass lines to open and valve 76 to close. Refrigerant will then flow into TCD 5 and a baseline thermal conductivity measurement may be taken along with a pressure and temperature measurement at the start of the regeneration cycle. Control circuitry 80 may then control valve 76 to open and valves 75 to close and after a predetermined time or when the refrigerant reaches a predetermined temperature, may request a mixing cycle from refrigeration controller 90. Refrigeration controller 90 may initiate the mixing cycle by turning on the compressor 60 and cryopumps 70 for a minute or so and then turning them off. Control circuitry 80 may then control valves 75 in the bypass lines to open and valve 76 to close. The warmer mixed refrigerant will then flow into TCD 5 and a thermal conductivity measurement may be taken along with pressure and temperature measurements. It should be noted that during the regeneration cycle the compressor and pumps are not generally operational and the refrigerant is stagnant, which may improve the accuracy of the measurements by removing flow effects. Processing circuitry 82 within control circuitry 80 may then determine the amount of contamination of the refrigerant from the respective thermal conductivity measurements and the temperature and pressure measurements.

FIG. 6 shows the difference in the corrected Voltage measured from a sensor at different sample points for pure refrigerant and refrigerant contaminated with 100 ppm $CO_2$. These measurements are taken at different times, with the system being flushed between the measurements.

Figure 7:
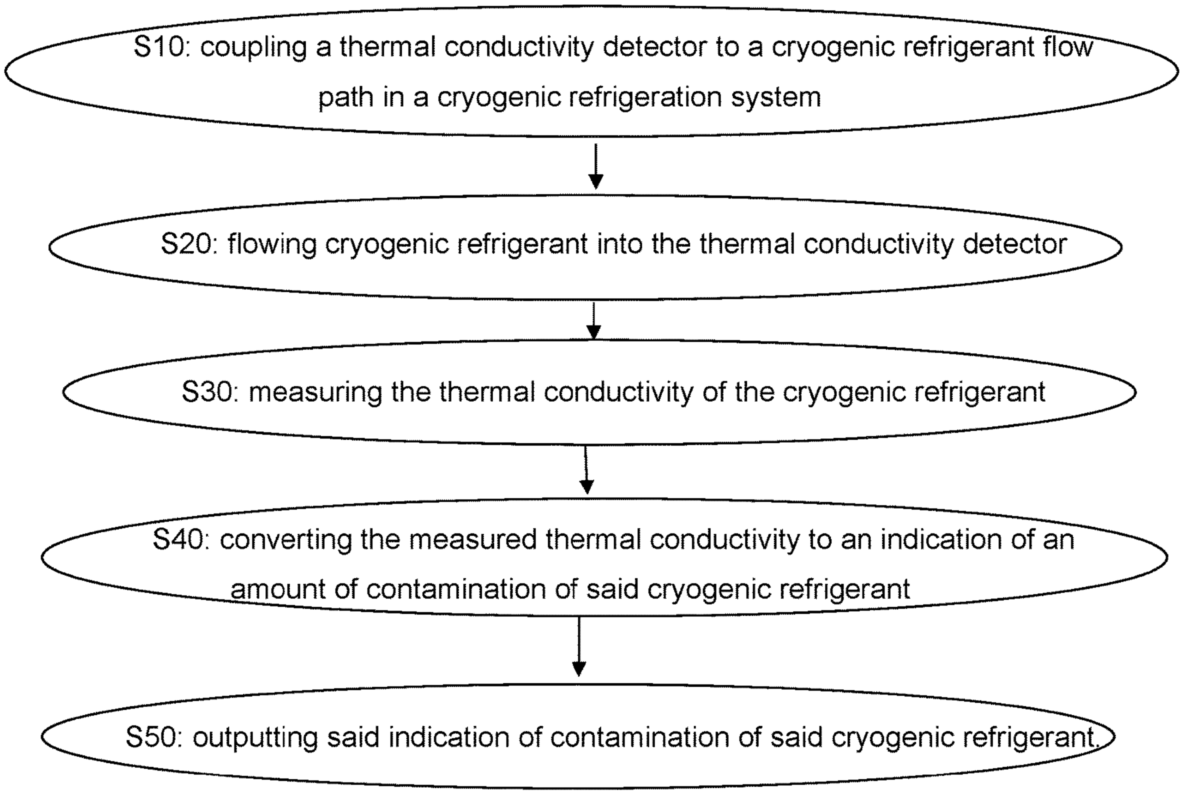
FIG. 7 shows a flow diagram illustrating steps in a method according to an embodiment.

FIG. 7 shows a flow diagram illustrating steps in a method according to an embodiment. Initially at step S10 the TCD is coupled to a cryogenic refrigerant flow path in a cryogenic refrigeration system. This may involve opening some valves, or it may involve an initial step of mounting the TCD to the system. Once coupled then at step S20 cryogenic refrigerant flows into the thermal conductivity detector, and at step S30 the thermal conductivity of the cryogenic refrigerant is measured. At step S40 the measured thermal conductivity is converted to an indication of an amount of contamination of the cryogenic refrigerant. This may involve a comparison with a thermal conductivity measurement for non-contaminated refrigerant and/or adjustments for measured temperature, pressure and potentially flow rate of the refrigerant at the time of the thermal conductivity measurements. At step S50 the calculated indication of contamination is output either directly by display (not shown) to a user, and/or as a signal to the control circuitry of the refrigeration system.

Although illustrative embodiments of the invention have been disclosed in detail herein, with reference to the accompanying drawings, it is understood that the invention is not limited to the precise embodiment and that various changes and modifications can be effected therein by one skilled in the art without departing from the scope of the invention as defined by the appended claims and their equivalents.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

The invention claimed is:

1. A sensor system for refrigeration system, said sensor system comprising:

an inlet for coupling to a refrigerant flow path in said refrigeration system;

a thermal conductivity detector in fluid communication with said inlet, said thermal conductivity detector being configured to generate a thermal conductivity signal indicative of a detected thermal conductivity of said refrigerant received from said refrigeration system when said sensor is coupled thereto;

circuitry configured to convert said thermal conductivity signal to an indication of contamination of said refrigerant based on the thermal conductivity signal being produced after warming of the refrigeration system caused the refrigeration system to release contaminants and while the contaminants are in the thermal conductivity detector; and an output configured to output said indication of contamination of said refrigerant.

2. The sensor system according to claim 1, wherein the circuitry forms part of a control circuitry of the sensor system, said control circuitry comprising an input for receiving at least one signal indicative of a current state of said refrigeration system, said control circuitry being configured to control operation of said thermal conductivity detector in dependence upon said at least one received signal.

3. The sensor system according to claim 2, said sensor system further comprising at least one valve arranged to control flow of said refrigerant to and from said thermal conductivity detector.

4. The sensor system according to claim 3, wherein said control circuitry is configured to control operation of said at least one valve.

5. The sensor system according to claim 2, wherein said control circuitry is configured to initiate said thermal conductivity detector to perform a thermal conductivity detection in response to determining said received signal indicates that said cryogenic refrigeration system is in a regeneration phase.

6. The sensor system according to claim 2, wherein said control circuitry is further configured in response to determining that said cryogenic refrigeration system is below 200K and said contaminants are frozen within said cryogenic refrigeration system to initiate said thermal conductivity detector to perform thermal conductivity detection as a baseline thermal conductivity detection.

7. The sensor system according to claim 6, wherein said control circuitry is configured in response to determining that said refrigeration system is above 220K to control said thermal conductivity detector to generate the signal indicative of the detected thermal conductivity of said refrigerant containing said released contaminants as a contamination thermal conductivity detection.

8. The sensor system according to claim 7, said circuitry being configured to convert said thermal conductivity signal to an indication of contamination of said cryogenic refrigerant in dependence upon both said baseline thermal conductivity detection and said contamination thermal conductivity detection.

9. The sensor system according to claim 1, wherein said thermal conductivity detector comprises a filament thermal conductivity detector.

10. The sensor system according to claim 9, comprising a further reference filament thermal conductivity detector, said further reference filament thermal conductivity detector being isolated from said refrigeration system and comprising refrigerant of a predetermined purity, said circuitry being configured to convert said thermal conductivity signal to an indication of contamination of said cryogenic refrigerant in dependence upon a comparison of said thermal conductivity detection of said further reference filament thermal conductivity detector and said filament thermal conductivity detector.

11. The sensor system according to claim 1, wherein said thermal conductivity detector comprises a microelectromechanical system (MEMS) device.

12. The sensor system according to claim 1, wherein said circuitry is configured to receive signals indicative of at least one of temperature and pressure of said refrigerant and to convert said thermal conductivity signal to said indication of contamination in dependence upon said at least one temperature and pressure.

13. A cryogenic refrigeration system comprising the sensor system for determining contamination of said refrigerant according to claim 1, wherein said refrigerant comprises a cryogenic refrigerant.

14. The cryogenic refrigeration system according to claim 13, further comprising at least one compressor for compressing said cryogenic refrigerant, at least one pump, and a controller for controlling operation of said cryogenic refrigeration system, said controller being configured to control a mixing cycle by triggering operation of said compressor and said at least one pump for a predetermined time prior to transmitting a signal to said sensor system for initiating detection of said contamination of said cryogenic refrigerant.

15. A method of detecting contamination of a refrigerant in a refrigeration system, said method comprising:

coupling a sensor comprising a thermal conductivity detector to a refrigerant flow path in said refrigeration system such that refrigerant flows into said thermal conductivity detector;

measuring the thermal conductivity of said refrigerant with said thermal conductivity detector;

converting said measured thermal conductivity to an indication of an amount of contamination of said refrigerant based on the thermal conductivity signal being produced after warming of the refrigeration system caused the refrigeration system to release contaminants and while the contaminants are in the thermal conductivity detector; and outputting said indication of contamination of said refrigerant.

* * * * *